(12) United States Patent
Zhu et al.

(10) Patent No.: US 10,122,492 B2
(45) Date of Patent: Nov. 6, 2018

(54) CHANNEL STATE INFORMATION ACQUISITION IN A WIRELESS COMMUNICATION SYSTEM

(71) Applicants: Dengkui Zhu, Beijing (CN); Boyu Li, Irvine, CA (US); Ping Liang, Newport Coast, CA (US)

(72) Inventors: Dengkui Zhu, Beijing (CN); Boyu Li, Irvine, CA (US); Ping Liang, Newport Coast, CA (US)

(73) Assignee: RF DSP INC., Irvine, CA (US)

( * ) Notice: Subject to any disclaimer, the term of this patent is extended or adjusted under 35 U.S.C. 154(b) by 0 days.

(21) Appl. No.: 15/744,425

(22) PCT Filed: Jun. 28, 2016

(86) PCT No.: PCT/US2016/039684
§ 371 (c)(1),
(2) Date: Jan. 12, 2018

(87) PCT Pub. No.: WO2017/003962
PCT Pub. Date: Jan. 5, 2017

(65) Prior Publication Data
US 2018/0212711 A1    Jul. 26, 2018

Related U.S. Application Data

(60) Provisional application No. 62/185,675, filed on Jun. 28, 2015.

(51) Int. Cl.
*H04L 1/00* (2006.01)
*H04L 5/00* (2006.01)
(Continued)

(52) U.S. Cl.
CPC .......... *H04L 1/0026* (2013.01); *H04L 5/0048* (2013.01); *H04L 5/0057* (2013.01);
(Continued)

(58) Field of Classification Search
CPC ... H04L 5/0051; H04L 5/0064; H04L 5/0035; H04L 5/0023; H04L 5/0048;
(Continued)

(56) References Cited

U.S. PATENT DOCUMENTS

2003/0053488 A1    3/2003  Hoole
2007/0223423 A1*   9/2007  Kim .................... H04B 7/0417
                                                  370/334
(Continued)

FOREIGN PATENT DOCUMENTS

CN    101193086 A     6/2008
WO    2015090463 A1   6/2015

OTHER PUBLICATIONS

PCT/US2016/039684 (ISA/237) Written Opinion of the International Search Authority dated May 1, 2017.

*Primary Examiner* — Andrew W Chriss
*Assistant Examiner* — Rasha Fayed
(74) *Attorney, Agent, or Firm* — Guosheng Wang; United States Research and Patent Firm

(57) ABSTRACT

This invention presents a method for uplink SRS transmission in MU-MIMO wireless communication systems comprising the BS reserving resources for SRS transmission and multiplexing the reserved resources among neighboring cells and among multiple UEs allocated to the same SRS transmission resource; the BS estimating the CQI of each UE through the uplink channel; and the BS allocating the same resource to a group of UEs to transmit uplink SRSs based on the estimated CQI and the QoS requirement.

3 Claims, 3 Drawing Sheets

(51) Int. Cl.
*H04W 72/08* (2009.01)
*H04B 7/0452* (2017.01)
*H04W 72/04* (2009.01)

(52) U.S. Cl.
CPC ......... *H04W 72/085* (2013.01); *H04B 7/0452* (2013.01); *H04W 72/0413* (2013.01)

(58) Field of Classification Search
CPC ......... H04L 5/0085; H04L 5/006; H04L 5/00; H04L 5/0053; H04L 5/0017; H04L 5/0039; H04L 5/0041; H04L 5/026; H04L 27/2613; H04L 27/2626; H04L 27/2647; H04L 27/2646; H04L 27/2655; H04L 27/2675; H04L 1/0015; H04L 1/0026; H04L 1/0035; H04L 1/0002; H04L 1/0009; H04L 1/0025; H04L 1/06; H04L 1/002; H04L 1/1671; H04W 24/02; H04W 72/04; H04W 72/0426; H04W 72/0413; H04W 72/121; H04W 72/12; H04W 72/042; H04W 72/0453; H04W 72/1231; H04W 72/1289; H04W 72/082; H04W 72/048; H04W 84/042; H04W 84/04; H04W 8/26; H04B 7/024; H04B 7/0417; H04B 7/0452; H04B 7/0665; H04B 7/0632

USPC ....... 370/329, 254, 334, 330, 503, 210, 335; 455/67.11; 375/141, 146
See application file for complete search history.

(56) References Cited

U.S. PATENT DOCUMENTS

| | | |
|---|---|---|
| 2008/0279170 A1 | 11/2008 | Malladi et al. |
| 2010/0177717 A1 | 7/2010 | Sung et al. |
| 2010/0246526 A1* | 9/2010 | Jing ................ H04W 72/082 370/329 |
| 2011/0110357 A1* | 5/2011 | Chung ................ H04W 48/08 370/344 |
| 2012/0051265 A1* | 3/2012 | Shen ................ H04L 5/0035 370/254 |
| 2012/0057557 A1 | 3/2012 | Prasad et al. |
| 2013/0034066 A1* | 2/2013 | Kakishima .......... H04L 27/2613 370/329 |
| 2013/0044725 A1 | 2/2013 | Chun et al. |
| 2013/0189930 A1* | 7/2013 | Kinnunen ............. H04W 16/12 455/67.11 |
| 2014/0029569 A1 | 1/2014 | Ni |
| 2016/0359599 A1* | 12/2016 | Sun ................ H04L 5/0048 |

* cited by examiner

US 10,122,492 B2

CHANNEL STATE INFORMATION ACQUISITION IN A WIRELESS COMMUNICATION SYSTEM

This application claims the benefit of U.S. Provisional Application No. 62/185,675, filed on Jun. 28, 2015.

FIELD OF THE INVENTION

The disclosed inventions relate generally to wireless communication, and in particular, to the mechanism for a Base Station (BS) to acquire the Channel State Information (CSI) of each User Equipment (UE) in a wireless communication system with reciprocal channels.

BACKGROUND

In a large-scale Multiple-Input Multiple-Output (MIMO) or massive MIMO system, the BS is equipped with tens to several hundreds of transmitting antennas. It has received enormous attention due to its capability to provide linear capacity growth without the need of increased power or bandwidth. This is realized by employing Multi-User MIMO (MU-MIMO) to serve multiple UEs simultaneously in the same Resource Blocks (RBs). In this system, the BS groups UEs at each scheduling slot and transmits data to them on the same time and frequency resource. In order to remove the mutual interference among these UEs and maximize the multi-user sum rate, the BS needs to know the CSI in the downlink and the Channel Quality Information (CQI) of each UE in particular. However, it is infeasible to obtain the CSI directly by sending reference pilots in the downlink because of two reasons: 1. the large number of antennas would cause a very large system overhead for reference signals in the downlink; 2. A larger number of bits is needed to quantize the CSI accurately, which would cause overload of the feedback channel in the uplink. As a result, the reciprocal property of a wireless channel, such as in a TDD system or in an FDD system using switching to create channel reciprocity between the uplink and downlink as described in our patent application PCT/US14/71752, can be employed to reduce the reference signal overhead. In such a system, a UE sends a Sounding Reference Signal (SRS) to the BS in the uplink. The BS then estimates the uplink CSI through the received SRSs and uses it to estimate the downlink CSI based on channel reciprocity.

SUMMARY OF THE INVENTION

This application provides a method to allocate radio resources used for the SRS, with multiplexing patterns of SRSs of multiple UEs. In this method, some special symbols in an uplink subframe are reserved for SRS. In addition, to avoid the inter-cell interference, the radio resources of these symbols are multiplexed among the neighboring BSs through Time-Division Multiplexing (TDM) or Frequency-Division Multiplexing (FDM). Moreover, FDM or Code-Division Multiplexing (CDM) is used to multiplex the resources among UEs belonging to the same BS.

BRIEF DESCRIPTION OF THE DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION OF THE PREFERRED EMBODIMENTS

Figure 1:
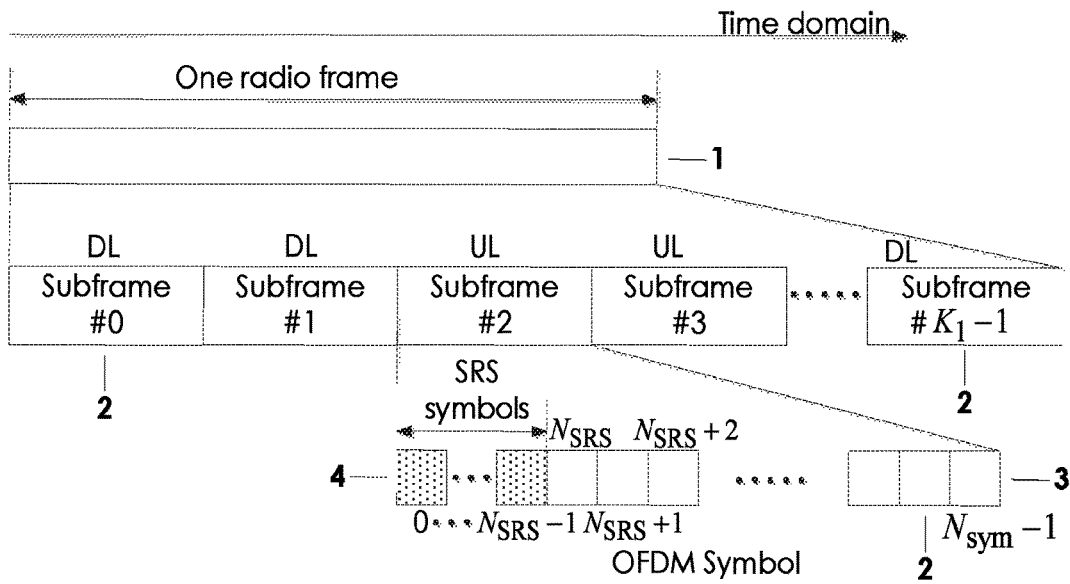
FIG. 1 shows the block diagram illustrating the frame structure and the locations of SRSs in a TDD wireless communication system.
Figure 2:
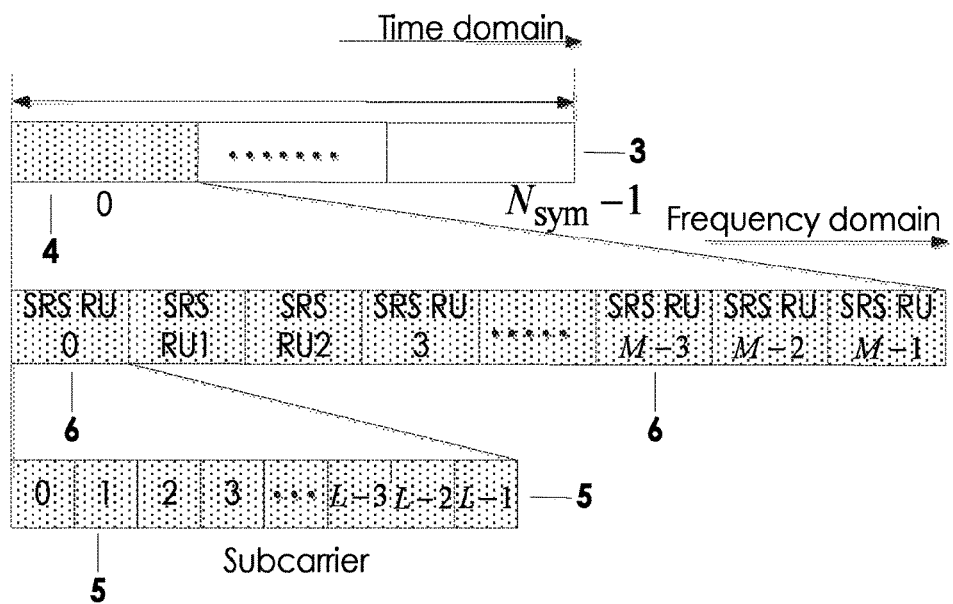
FIG. 2 shows the block diagram illustrating the time-frequency structure of one SRS symbol.

FIG. 1 illustrates the frame resource structure of a wireless communication system. In such a system, one radio frame 1 includes $K_1$ subframes 2, where each subframe includes $N_{sym}$ consecutive Orthogonal Frequency-Division Multiplexing (OFDM) symbols 3. Among the $K_1$ subframes, $K_2$ subframes are used for uplink signal transmission, i.e., uplink subframes, while the rest $K_3 = K_1 - K_2$ subframes are used for downlink signal transmission, i.e., downlink subframes, in TDD systems. A total of $N_{SRS}$ consecutive OFDM symbols are reserved for SRS symbols 4 in one of the uplink subframes. FIG. 2 illustrates the time-frequency structure of a SRS symbol. In the frequency domain, the $N_{used}$ usable subcarriers 5 of an OFDM symbol are divided in to M segments with $L = N_{used}/M$ subcarriers in each segment, where L is assumed to be an integer. A segment is called an SRS RU 6.

The SRSs are transmitted in an uplink subframe with a period of T subframes. These $N_{SRS}$ consecutive OFDM symbols may be chosen as the first or the last $N_{SRS}$ OFDM symbols of an uplink subframe. These $N_{SRS}$ consecutive symbols are called the SRS region. Two methods are presented to share the SRS region by the neighboring $N_{BS}$ BSs in order to avoid inter-cell interference.

Method-1.

Figure 3:
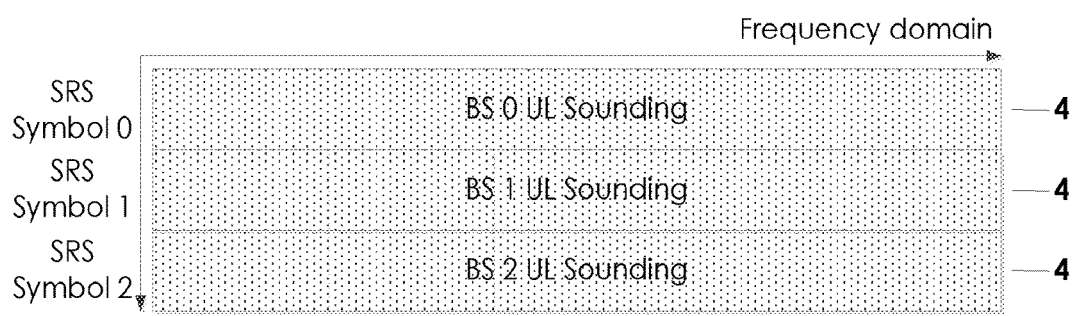
FIG. 3 shows the block diagram illustrating one deployment example where TDM is used to multiplex the SRS symbols among three neighboring BSs.

In Method-1, every $N_{SRS}/N_{BS}$ SRS symbols are reserved for a different BS, e.g., in FIG. 3, the SRS symbols 4 0-2 are used for the BSs 0-2 respectively where $N_{SRS} = N_{BS} = 3$ in this example. Note that $N_{SRS}$ and $N_{BS}$ are properly chosen to ensure that $N_{SRS}/N_{BS}$ is an integer. One way to determine the SRS symbol indices is that the SRS symbols with indices from $$\frac{N_{SRS}}{N_{BS}}$$

(BS_ID mod $N_{BS}$) to $$\frac{N_{SRS}}{N_{BS}}$$

[(BS_ID mod $N_{BS}$)+1]−1 are reserved for the BS with the identification number BS_ID, where mod represents the modular arithmetic operation.

Method-2.

In Method-2, all the $N_{SRS}$ SRS symbols are divided into $N_{BS}$ segments in the frequency domain, where each segment includes $M/N_{BS}$ SRS RUs. Note that M and $N_{BS}$ are properly chosen to ensure that $M/N_{BS}$ is an integer. Then, each segment is reserved for a different BS. One way to determine the segment index used by the BS with the identification number BS_ID in the $n_{sym}$ th SRS symbol is $$\left[\left(BS_{ID} + \left\lfloor \frac{n_{sym}}{N_{SRS}/N_{BS}} \right\rfloor\right) \bmod N_{BS}\right],$$

Figure 4:
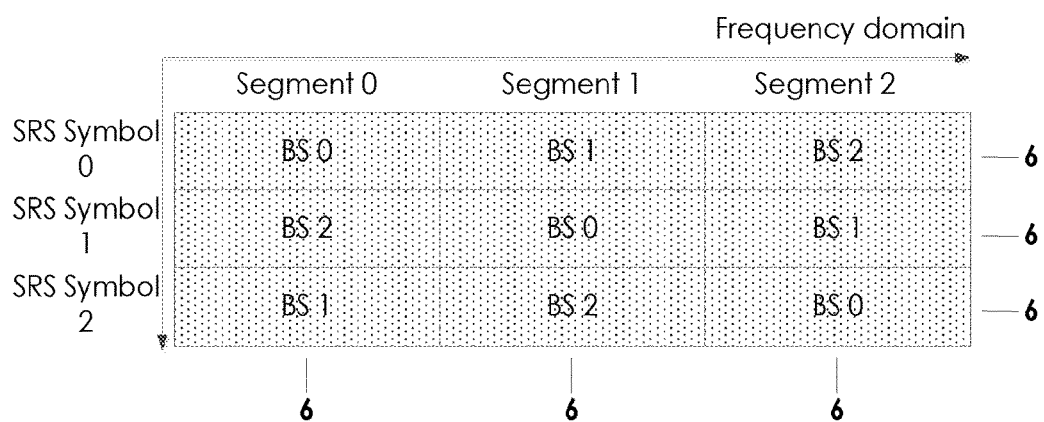
FIG. 4 shows the block diagram illustrating one deployment example where FDM is used to multiplex the SRS symbols among three neighboring BSs.

$n_{sym}=0, \ldots, N_{SRS}-1$. FIG. 4 illustrates an example where $N_{BS}=3$ and $N_{SRS}=3$ hence each segment includes 1 SRS RU 6.

A SRS channel is defined as the radio resource unit on which the SRS is carried so that the channel between each transmitting antenna of each UE and all receiving antennas of the associated BS could be estimated.

Because of the flat fading feature, channel coefficients of all subcarriers in one SRS RU are almost the same, hence only one SRS channel is needed for one transmitting antenna of a UE. This means that one SRS RU can provide L SRS channels. In order to avoid the inter-channel interference, two methods are proposed to multiplex these L SRS channels.

Method-1 FDM.

Figure 5:
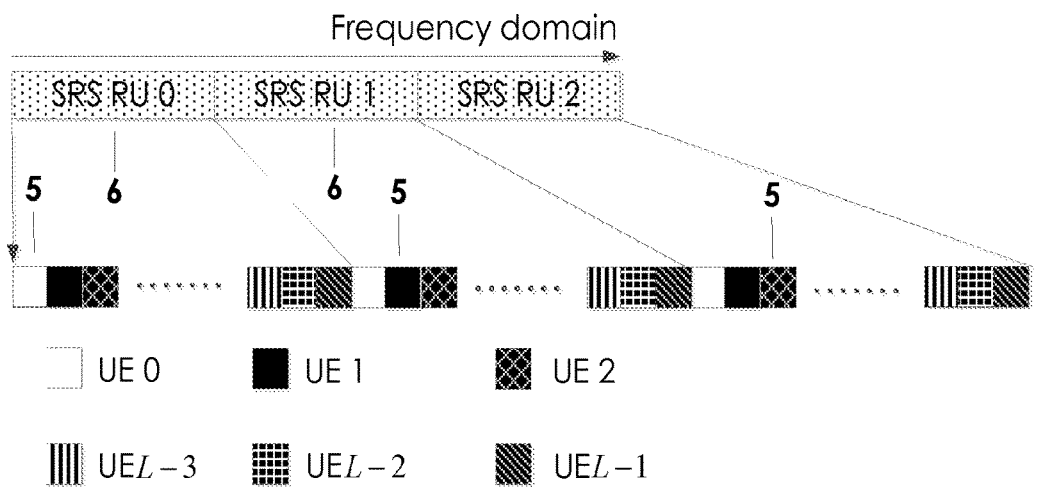
FIG. 5 shows the block diagram illustrating the use of FDM to multiplex the SRS Resource Units (RUs) among UEs belonging to the same BS.

In Method-1, each SRS channel is assigned for a different subcarrier in one SRS RU. FIG. 5 illustrates an example of this option where each SRS RU 6 provides L SRS channels for L UEs with each SRS channel being assigned for a different subcarrier 5 in one SRS RU.

Method-2 CDM.

In Method-2, each SRS channel uses all the L subcarriers in one SRS RU, while the signal sequences transmitted by the L SRS channels are mutually orthogonal. e.g., the signal sequences for the L channels are $s_1, \ldots, s_L$, and they satisfy the constraints $$\begin{cases} |\langle s_i, s_j \rangle| = 0, i \neq j, \\ |\langle s_i, s_j \rangle| = L, i = j, \end{cases}$$

where the function $\langle a, b \rangle$ denotes the inner product of vectors a and b in the complex Hilbert space. The L signal sequences constitute a sequence set.

To homogenize the interference from neighboring BSs on each SRS channel, d different sequence sets where $d \leq L+1$ are predefined so that the correlation coefficient between the kth sequence of the ith set $s_k^i$ and the lth sequence of the jth set $s_l^j$ satisfies $$\begin{cases} |\langle s_k^i, s_l^j \rangle| = \sqrt{L}, i \neq j, \\ |\langle s_k^i, s_l^j \rangle| = L\delta_{kl}, i = j, \end{cases}$$

where $\delta_{kl}$ is the Kronecker delta function. The mapping relation between the sequence set index and the BS_ID should follow some predefined functions, e.g., setting the index of the sequence set allocated to the BS with identification number BS_ID as $(\lfloor BS\_ID/L \rfloor \bmod d)$. The tables I and II provide examples of sequence sets when L=4 and L=8 respectively.

The BS determines the number of SRS channels allocated to each UE according to two factors: 1. The number of receiving antennas of a UE $n_{rx}$; 2. The bandwidth, i.e., $n_{RU}$ consecutive SRS RUs in the frequency domain, allocated to a UE in the downlink transmission. Then, the number of SRS channels allocated to the UE is calculated as $n_{SRSchan}=n_{rx}n_{RU}$, and the location information of the SRS channels is informed to the UE through the downlink control channel.

Figure 6:
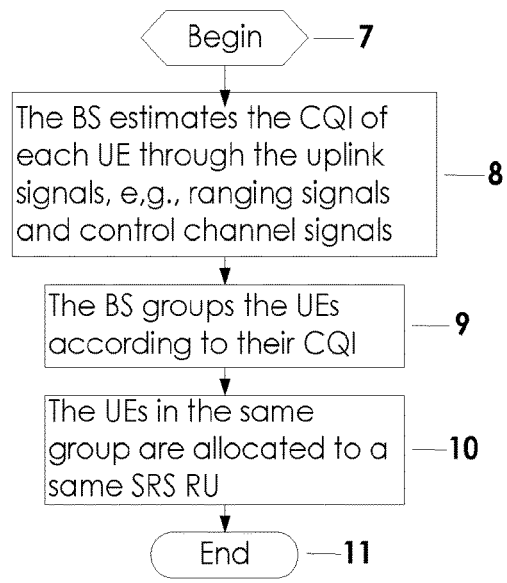
FIG. 6 shows the flowchart illustrating the process of a BS grouping UEs sending SRSs on the same resources.

The BS determines the UEs allocated to the same SRS RU according to the estimated CQI as shown in FIG. 6. Specifically, after the process begins 7, the BS first determines the CQI of each UE through the uplink signals, e.g., ranging signals and control channel signals 8. Then, the BS groups the UEs according to their CQI 9. After that, the UEs in the same group are allocated to the same SRS RU 10, before the process ends 11. For example, the UEs among which the maximum CQI difference is less than a predefined threshold value are allocated into the same SRS RU. The BS could estimate the CQI of UEs through the uplink control channels, e.g., the physical ranging channel and the physical uplink control channel

TABLE I

The sequence set with L = 4.

set 0

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

set 1

$$\begin{bmatrix} 1 & 1 & 1 & 1 \\ j & -j & j & -j \\ 1 & 1 & -1 & -1 \\ -j & j & j & -j \end{bmatrix}$$

set 2

$$\begin{bmatrix} 1 & 1 & 1 & 1 \\ j & -j & j & -j \\ j & j & -j & -j \\ -1 & 1 & 1 & -1 \end{bmatrix}$$

set 3

$$\begin{bmatrix} 1 & 1 & 1 & 1 \\ 1 & -1 & 1 & -1 \\ j & j & -j & -j \\ -j & j & j & -j \end{bmatrix}$$

TABLE II

The sequence set with L = 8.

set 0

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

set 1

$$\begin{bmatrix} 1 & 1 & 1 & 1 & 1 & 1 & 1 & 1 \\ j & -j & j & -j & j & -j & j & -j \\ j & j & -j & -j & j & j & -j & -j \\ -1 & 1 & 1 & -1 & -1 & 1 & 1 & -1 \\ 1 & 1 & 1 & 1 & -1 & -1 & -1 & -1 \\ -j & j & -j & j & j & -j & j & -j \\ j & j & -j & -j & -j & -j & j & j \\ 1 & -1 & -1 & 1 & -1 & 1 & 1 & -1 \end{bmatrix}$$

set 2

$$\begin{bmatrix} 1 & 1 & 1 & 1 & 1 & 1 & 1 & 1 \\ j & -j & j & -j & j & -j & j & -j \\ 1 & 1 & -1 & -1 & 1 & 1 & -1 & -1 \\ -j & j & j & -j & -j & j & j & -j \\ 1 & 1 & 1 & 1 & -1 & -1 & -1 & -1 \\ j & -j & j & -j & -j & j & -j & j \\ -1 & -1 & 1 & 1 & 1 & 1 & -1 & -1 \\ j & -j & -j & j & -j & j & j & -j \end{bmatrix}$$

set 3

$$\begin{bmatrix} 1 & 1 & 1 & 1 & 1 & 1 & 1 & 1 \\ 1 & -1 & 1 & -1 & 1 & -1 & 1 & -1 \\ j & j & -j & -j & j & j & -j & -j \\ -j & j & j & -j & -j & j & j & -j \\ 1 & 1 & 1 & 1 & -1 & -1 & -1 & -1 \\ -1 & 1 & -1 & 1 & 1 & -1 & 1 & -1 \\ -j & -j & j & j & j & j & -j & -j \\ -j & j & j & -j & j & -j & -j & j \end{bmatrix}$$

set 4

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ -1 & 1 & 1 & -1 & -1 & 1 & 1 & -1 \\ j & j & j & j & -j & -j & -j & -j \\ j & -j & j & -j & -j & j & -j & j \\ j & j & -j & -j & -j & -j & j & j \\ -j & j & j & -j & j & -j & -j & j \end{bmatrix}$$

TABLE II-continued

The sequence set with L = 8.

set 5

$$\begin{bmatrix} 1 & 1 & 1 & 1 & 1 & 1 & 1 & 1 \\ j & -j & j & -j & j & -j & j & -j \\ j & j & -j & -j & j & j & -j & -j \\ 1 & -1 & -1 & 1 & 1 & -1 & -1 & 1 \\ j & j & j & j & -j & -j & -j & -j \\ 1 & -1 & 1 & -1 & -1 & 1 & -1 & 1 \\ -1 & -1 & 1 & 1 & 1 & 1 & -1 & -1 \\ -j & j & j & -j & j & -j & -j & j \end{bmatrix}$$

set 6

$$\begin{bmatrix} 1 & 1 & 1 & 1 & 1 & 1 & 1 & 1 \\ j & -j & j & -j & j & -j & j & -j \\ 1 & 1 & -1 & -1 & 1 & 1 & -1 & -1 \\ j & -j & -j & j & j & -j & -j & j \\ j & j & j & j & -j & -j & -j & -j \\ -1 & 1 & -1 & 1 & 1 & -1 & 1 & -1 \\ -j & -j & j & j & j & j & -j & -j \\ 1 & -1 & -1 & 1 & -1 & 1 & 1 & -1 \end{bmatrix}$$

set 7

$$\begin{bmatrix} 1 & 1 & 1 & 1 & 1 & 1 & 1 & 1 \\ 1 & -1 & 1 & -1 & 1 & -1 & 1 & -1 \\ j & j & -j & -j & j & j & -j & -j \\ j & -j & -j & j & j & -j & -j & j \\ j & j & j & j & -j & -j & -j & -j \\ -j & j & -j & j & j & -j & j & -j \\ 1 & 1 & -1 & -1 & -1 & -1 & 1 & 1 \\ -1 & 1 & 1 & -1 & 1 & -1 & -1 & 1 \end{bmatrix}$$

We claim:

1. A method for uplink Sounding Reference Signal (SRS) transmission in a MU-MIMO wireless communication system comprising a BS reserving resources for SRS transmission and multiplexing the reserved resources among neighboring cells and among multiple UEs allocated to the same SRS transmission resource, wherein $N_{SRS}$ consecutive OFDM symbols in a radio resource frame are reserved for SRS transmission, where the $N_{SRS}$ SRS symbols are multiplexed among $N_{BS}$ neighboring cells through Time Division Multiplexing (TDM) or Frequency Division Multiplexing (FDM), wherein TDM is implemented by each of the $N_{BS}$ neighboring BSs using specified $N_{SRS}/N_{BS}$ of the $N_{SRS}$ SRS symbols calculated based on the BS identification number BS_ID or cell ID to transmit SRSs;

the BS estimating the CQI of each UE through the uplink channel; and the BS allocating the same resource to a group of UEs to transmit uplink SRSs based on an estimated channel quality and a Quality of Service (QoS) requirement.

2. A method for uplink Sounding Reference Signal (SRS) transmission in a MU-MIMO wireless communication system comprising a BS reserving resources for SRS transmission and multiplexing the reserved resources among neighboring cells and among multiple UEs allocated to the same SRS transmission resource, wherein $N_{SRS}$ consecutive OFDM symbols in a radio resource frame are reserved for SRS transmission, where the $N_{SRS}$ SRS symbols are multiplexed among $N_{BS}$ neighboring cells through TDM or FDM, wherein FDM is implemented by dividing the whole band into $N_{BS}$ segments, where each BS is allocated one segment in one SRS symbol based on BS_ID or cell ID and the SRS symbol index in a subframe so that each BS uses a different segment in a different SRS symbol;

the BS estimating the CQI of each UE through the uplink channel; and the BS allocating the same resource to a group of UEs to transmit uplink SRSs based on the an estimated channel quality and a Quality of Service (QoS) requirement.

3. A method for uplink Sounding Reference Signal (SRS) transmission in a MU-MIMO wireless communication system comprising a BS reserving resources for SRS transmission and multiplexing the reserved resources among neighboring cells and among multiple UEs allocated to the same SRS transmission resource;

the BS estimating the CQI of each UE through the uplink channel; and the BS allocating the same resource to a group of UEs to transmit uplink SRSs based on an estimated channel quality and a Quality of Service (QoS) requirement;

wherein the BS groups the UEs according to their CQI and the QoS requirements including one or more of their downloading speed and amount of data to be transmitted, where the UEs whose channel quality differences are lower than a predefined threshold and whose QoS requirement differences are also lower than a predefined threshold are allocated to the same group with the same SRS transmission resource;

wherein the resource is allocated for a group of UEs for SRS transmission in the reserved SRS transmission symbols for a BS consisting of several SRS Resource Units (RUs), where each SRS RU is the minimum SRS transmission unit consisting of several continuous sub-carriers in the frequency domain and one to several OFDM symbols in the time domain;

wherein multiple UEs in a group are multiplexed through Code Division Multiplexing (CDM) in an SRS RU, where the CDM multiplexing is implemented by allocating each UE a specific sequence orthogonal to other UEs in the same group; and wherein every $N_{BS}$ BSs being allocated a set of orthogonal sequences selected from predefined orthogonal sequence sets, where the absolute value of the correlation coefficient between any two sequences from two different sequence sets being a constant value.

* * * * *